United States Patent
Nishida

(10) Patent No.: US 11,090,645 B2
(45) Date of Patent: Aug. 17, 2021

(54) SOLUTION JETTING DEVICE AND METHOD OF CONTROLLING JET OF SOLUTION

(71) Applicant: FUJIFILM Corporation, Tokyo (JP)

(72) Inventor: Shoji Nishida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 330 days.

(21) Appl. No.: 16/118,467

(22) Filed: Aug. 31, 2018

(65) Prior Publication Data

US 2018/0369803 A1 Dec. 27, 2018

Related U.S. Application Data

(63) Continuation of application No. PCT/JP2017/001810, filed on Jan. 19, 2017.

(30) Foreign Application Priority Data

Mar. 22, 2016 (JP) .............................. JP2016-056949

(51) Int. Cl.
*B01L 3/02* (2006.01)
*G01N 35/10* (2006.01)
(Continued)

(52) U.S. Cl.
CPC ............. *B01L 3/021* (2013.01); *B01L 3/0265* (2013.01); *B01L 3/0282* (2013.01); *B01L 3/561* (2013.01);
(Continued)

(58) Field of Classification Search
None
See application file for complete search history.

(56) References Cited

U.S. PATENT DOCUMENTS 4,523,484 A 6/1985 Kadota et al.
4,586,546 A 5/1986 Mezei et al.
(Continued)

FOREIGN PATENT DOCUMENTS

CN 106471374 3/2017
JP H02-236456 9/1990
(Continued)

OTHER PUBLICATIONS

"Office Action of Japan Counterpart Application," with English translation thereof, dated Oct. 29, 2019, p. 1-p. 7.
(Continued)

*Primary Examiner* — Paul S Hyun
(74) *Attorney, Agent, or Firm* — JCIPRNET

(57) ABSTRACT

A solution jetting device includes: a cylindrical member; a movable member that is movably fitted to a hollow portion of the cylindrical member; a first drive mechanism that moves the movable member; a first flow passage that connects a solution container, in which a solution containing a biological sample or containing a reagent to be reacted with a biological sample is contained, to the hollow portion; an openable and closable first on-off valve that is provided on the first flow passage; a jetting tool that jets the solution to an objective region; a second flow passage that connects the hollow portion to the jetting tool; an openable and closable second on-off valve that is provided on the second flow passage; a second drive mechanism as defined herein; and a control unit as defined herein.

20 Claims, 13 Drawing Sheets

(51) Int. Cl.
*B01L 3/00* (2006.01)
*G01N 35/04* (2006.01)
*G01N 35/00* (2006.01)

(52) U.S. Cl.
CPC .......... *B01L 3/567* (2013.01); *G01N 35/1016* (2013.01); *B01L 2200/0605* (2013.01); *B01L 2200/0684* (2013.01); *B01L 2200/143* (2013.01); *B01L 2300/049* (2013.01); *B01L 2300/08* (2013.01); *B01L 2300/0832* (2013.01); *B01L 2300/0877* (2013.01); *B01L 2400/0457* (2013.01); *B01L 2400/0478* (2013.01); *B01L 2400/0481* (2013.01); *B01L 2400/06* (2013.01); *B01L 2400/0666* (2013.01); *G01N 35/1004* (2013.01); *G01N 35/1011* (2013.01); *G01N 2035/00435* (2013.01); *G01N 2035/0437* (2013.01); *G01N 2035/0444* (2013.01)

(56) References Cited

U.S. PATENT DOCUMENTS

| | | |
|---|---|---|
| 5,358,691 A | 10/1994 | Clark et al. |
| 5,376,313 A | 12/1994 | Kanewske, III et al. |
| 5,451,528 A | 9/1995 | Raymoure et al. |
| 5,482,861 A | 1/1996 | Clark et al. |
| 5,507,410 A | 4/1996 | Clark et al. |
| 5,536,471 A | 7/1996 | Clark et al. |
| 5,540,890 A | 7/1996 | Clark et al. |
| 5,575,978 A | 11/1996 | Clark et al. |
| 5,578,494 A | 11/1996 | Clark et al. |
| 5,605,665 A | 2/1997 | Clark et al. |
| 5,610,069 A | 3/1997 | Clark et al. |
| 5,627,522 A | 5/1997 | Walker et al. |
| 5,635,364 A | 6/1997 | Clark et al. |
| 5,646,049 A | 7/1997 | Tayi |
| 5,762,878 A | 6/1998 | Clark et al. |
| 5,960,160 A | 9/1999 | Clark et al. |
| 6,096,561 A | 8/2000 | Tayi |
| 6,190,617 B1 | 2/2001 | Clark et al. |
| 2004/0149015 A1 | 8/2004 | Hansen et al. |
| 2017/0205321 A1 | 7/2017 | Sasaki et al. |

FOREIGN PATENT DOCUMENTS

| | | |
|---|---|---|
| JP | H07505473 | 6/1995 |
| JP | H1057850 | 3/1998 |
| JP | 2005291729 | 10/2005 |
| JP | 2010-096643 | 4/2010 |
| JP | 2011099769 | 5/2011 |
| JP | 2012-021926 | 2/2012 |
| WO | 2016009764 | 1/2016 |

OTHER PUBLICATIONS

"International Search Report (Form PCT/ISA/210)" of PCT/JP2017/001810, dated Mar. 7, 2017, with English translation thereof, pp. 1-5.

"Written Opinion of the International Searching Authority (Form PCT/ISA/237)" of PCT/JP2017/001810, dated Mar. 7, 2017, with English translation thereof, pp. 1-13.

"Office Action of Japan Counterpart Application," dated Apr. 23, 2019, with English translation thereof, p. 1-p. 9.

"Office Action of China Counterpart Application", dated Mar. 22, 2021, with English translation thereof, pp. 1-18.

SOLUTION JETTING DEVICE AND METHOD OF CONTROLLING JET OF SOLUTION

CROSS REFERENCE TO RELATED APPLICATION

This is a continuation of International Application No. PCT/JP2017/001810 filed on Jan. 19, 2017, and claims priority from Japanese Patent Application No. 2016-056949 filed on Mar. 22, 2016, the entire disclosures of which are incorporated herein by reference.

BACKGROUND OF THE INVENTION

1. Field of the Invention

The present invention relates to a solution jetting (ejecting) device and a method of controlling the jet (ejection) of a solution.

2. Description of the Related Art

Biochemical analyzers that perform the biochemical analysis of a biological sample by making the biological sample, such as the serum, urine, or excreta of a human body, and a reagent react with each other in a transparent measurement container called a cuvette and optically measuring a color caused by the reaction of a sample solution formed of the biological sample and the reagent are known (for example, see JP2005-291729A, JP1995-505473A (JP-H07-505473A), and JP2012-21926A).

JP2005-291729A, JP1995-505473A (JP-H07-505473A), and JP2012-21926A disclose biochemical analyzers. Each of the biochemical analyzers sucks a solution, such as a biological sample or a reagent, into a hollow portion of a syringe from a hole portion provided at the syringe by moving a plunger fitted to the hollow portion in a direction in which the volume of the hollow portion is increased, and jets the solution into the measurement container from a nozzle connected to the hole portion of the syringe by moving the plunger in a direction in which the volume of the hollow portion is reduced.

The biochemical analyzer disclosed in JP2005-291729A controls the surface of a solution, which is jetted to the measurement container, and the end face of the nozzle to the same height in a case in which the jet of a solution ends. Accordingly, the biochemical analyzer prevents a solution from remaining on the distal end of the nozzle in the form of a droplet.

The biochemical analyzer disclosed in JP1995-505473A (JP-H07-505473A) makes the amount of a solution, which adheres to the outer periphery of the distal end of the nozzle, constant and stabilizes the amount of a solution to be jetted by controlling the depth of a portion of the end face of the nozzle submerged in a solution, which is jetted to the measurement container, in a case in which the jet of a solution ends.

The biochemical analyzer disclosed in JP2012-21926A sucks a solution into the syringe, returns a small amount of a solution of the sucked solution to a storage container for a solution, and jets a solution, which remains in the syringe, to the measurement container in this state. Accordingly, the biochemical analyzer controls the amount of a solution, which is to be jetted, with high accuracy by absorbing an error caused by the backlash of a syringe pump.

JP1998-57850A (JP-H10-57850A) discloses a device that jets a chemical for a semiconductor wafer to a semiconductor wafer. This device performs a suck-back step of preventing liquid from dripping by sucking in a chemical remaining in the distal end portion of the nozzle after jetting a chemical, which is sucked into a pump chamber, onto a semiconductor wafer from the nozzle. Then, the biochemical analyzer performs a residual pressure-removing step of removing residual pressure in the pump chamber, sucks a chemical into the pump chamber after the residual pressure-removing step, and proceeds to a state in which the next jet of a chemical is prepared.

SUMMARY OF THE INVENTION

There is a device in which the amount of a solution to be jetted is, for example, 5 ml (milliliter) or less, that is, very small as a device that is used to analyze a biological sample as typified by a biochemical analyzer. There is a possibility that a small error in the amount of a solution to be jetted significantly affects an effect of analyzing a biological sample in a case in which the amount of a solution to be jetted is small as described above. Accordingly, the amount of a solution to be jetted needs to be controlled with high accuracy in such a device.

JP2005-291729A discloses a technique for preventing a solution from adhering to the distal end of the nozzle by controlling the position of the distal end face of the nozzle but does not disclose how to control the amount of a solution to be jetted. Further, the importance of the accuracy of the amount of a solution to be jetted is not considered in JP2005-291729A.

JP1995-505473A (JP-H07-505473A) discloses a technique for controlling the amount of a solution adhering to the distal end of the nozzle so that the amount of a solution adhering to the distal end of the nozzle is constant, but does not specifically disclose how to control the amount of a solution to be jetted.

JP2012-21926A discloses a method of reducing an error in the amount of a solution to be jetted in a case in which the solution is jetted by the syringe pump. However, JP2012-21926A does not disclose a method of controlling the distal end of the nozzle in detail.

JP1998-57850A (JP-H10-57850A) discloses a technique for jetting a solution to a large object, such as a semiconductor wafer, and problems, which may occur in a case in which the amount of a solution to be jetted is small, are not considered in JP1998-57850A (JP-H10-57850A).

The invention has been made in consideration of the above-mentioned circumstances, and an object of the invention is to provide a solution jetting device and a method of controlling the jet of a solution that can improve analysis performance for a biological sample by controlling the amount of a biological sample or a solution, which includes a reagent used to react with a biological sample, to be jetted with high accuracy.

A first solution jetting device of the invention comprises: a cylindrical member; a movable member that is movably fitted to a hollow portion of the cylindrical member; a first drive mechanism that moves the movable member; a first flow passage that connects a solution container, in which a solution including a biological sample or a solution including a reagent used to react with a biological sample is contained, to the hollow portion; an openable and closable first on-off valve that is provided on the first flow passage; a jetting tool that jets the solution to an objective region; a second flow passage that connects the hollow portion to the jetting tool; an openable and closable second on-off valve that is provided on the second flow passage; a second drive mechanism that moves an end face, which includes an outlet for the solution, of the jetting tool in a direction of gravity; and a control unit that jets the solution to the objective region from the jetting tool by performing first control, second control, and third control. The control unit performs the first control for sucking the solution into the hollow portion from the solution container by moving the movable member through the first drive mechanism in a state in which the first on-off valve is opened and the second on-off valve is closed, performs the second control for discharging a part of the solution, which is present in the hollow portion, to the first flow passage by moving the movable member through the first drive mechanism, and performs the third control for discharging the solution, which is present in the hollow portion, to the second flow passage by moving the movable member through the first drive mechanism in a state in which the first on-off valve is closed and the second on-off valve is opened. The control unit completes the jet of the solution to the objective region in a state in which the end face, which includes the outlet for the solution, of the jetting tool is positioned in the solution jetted to the objective region and a distance between the end face and a surface of the solution in the direction of gravity is in the range of 0.1 mm to 1.0 mm.

A second solution jetting device of the invention comprises: a cylindrical member; a movable member that is movably fitted to a hollow portion of the cylindrical member; a first drive mechanism that moves the movable member; a first flow passage that connects a solution container, in which a solution including a biological sample or a solution including a reagent used to react with a biological sample is contained, to the hollow portion; an openable and closable first on-off valve that is provided on the first flow passage; a jetting tool that jets the solution to an objective region; a second flow passage that connects the hollow portion to the jetting tool; an openable and closable second on-off valve that is provided on the second flow passage; a second drive mechanism that moves an end face, which includes an outlet for the solution, of the jetting tool in a direction of gravity; and a control unit that jets the solution to the objective region from the jetting tool by performing first control, second control, and third control. The control unit performs the first control for sucking the solution toward the hollow portion from the second flow passage by moving the movable member through the first drive mechanism in a state in which the first on-off valve is closed and the second on-off valve is opened, performs the second control for sucking the solution into the hollow portion from the solution container by moving the movable member through the first drive mechanism in a state in which the first on-off valve is opened and the second on-off valve is closed, and performs the third control for discharging the solution, which is present in the hollow portion, to the second flow passage by moving the movable member through the first drive mechanism in a state in which the first on-off valve is closed and the second on-off valve is opened. The control unit completes the jet of the solution to the objective region in a state in which the end face, which includes the outlet for the solution, of the jetting tool is positioned in the solution jetted to the objective region and a distance between the end face and a surface of the solution in the direction of gravity is in the range of 0.1 mm to 1.0 mm.

A first method of controlling the jet of a solution of the invention is a method of controlling the jet of a solution by a device including a first drive mechanism that moves a movable member movably fitted to a hollow portion of a cylindrical member, a first flow passage that connects a solution container, in which a solution including a biological sample or a solution including a reagent used to react with a biological sample is contained, to the hollow portion, an openable and closable first on-off valve that is provided on the first flow passage, a jetting tool that jets the solution to an objective region, a second flow passage that connects the hollow portion to the jetting tool, an openable and closable second on-off valve that is provided on the second flow passage, and a second drive mechanism that moves an end face, which includes an outlet for the solution, of the jetting tool in a direction of gravity. The method comprises: a first step of sucking the solution into the hollow portion from the solution container by moving the movable member through the first drive mechanism in a state in which the first on-off valve is opened and the second on-off valve is closed; a second step of discharging a part of the solution, which is present in the hollow portion, to the first flow passage by moving the movable member through the first drive mechanism, after the first step; and a third step of discharging the solution, which is present in the hollow portion, to the second flow passage and jetting the solution to the objective region from the jetting tool by moving the movable member through the first drive mechanism in a state in which the first on-off valve is closed and the second on-off valve is opened, after the second step. In the third step, the jet of the solution to the objective region is completed in a state in which the end face, which includes the outlet for the solution, of the jetting tool is positioned in the solution jetted to the objective region and a distance between the end face and a surface of the solution in the direction of gravity is in the range of 0.1 mm to 1.0 mm.

A second method of controlling the jet of a solution of the invention is a method of controlling the jet of a solution by a device including a first drive mechanism that moves a movable member movably fitted to a hollow portion of a cylindrical member, a first flow passage that connects a solution container, in which a solution including a biological sample or a solution including a reagent used to react with a biological sample is contained, to the hollow portion, an openable and closable first on-off valve that is provided on the first flow passage, a jetting tool that jets the solution to an objective region, a second flow passage that connects the hollow portion to the jetting tool, an openable and closable second on-off valve that is provided on the second flow passage, and a second drive mechanism that moves an end face, which includes an outlet for the solution, of the jetting tool in a direction of gravity. The method comprises: a first step of sucking the solution toward the hollow portion from the second flow passage by moving the movable member through the first drive mechanism in a state in which the first on-off valve is closed and the second on-off valve is opened; a second step for sucking the solution into the hollow portion from the solution container by moving the movable member through the first drive mechanism in a state in which the first on-off valve is opened and the second on-off valve is closed, after the first step; and a third step of discharging the solution, which is present in the hollow portion, to the second flow passage and jetting the solution to the objective region from the jetting tool by moving the movable member through the first drive mechanism in a state in which the first on-off valve is closed and the second on-off valve is opened, after the second step. In the third step, the jet of the solution to the objective region is completed in a state in which the end face, which includes the outlet for the solution, of the jetting tool is positioned in the solution jetted to the objective region and a distance between the end face and a surface of the solution in the direction of gravity is in the range of 0.1 mm to 1.0 mm.

According to the invention, it is possible to provide a solution jetting device and a method of controlling the jet of a solution that can improve analysis performance for a biological sample by controlling the amount of a biological sample or a solution, which includes a reagent used to react with a biological sample, to be jetted with high accuracy.

EXPLANATION OF REFERENCES

Figure 1:
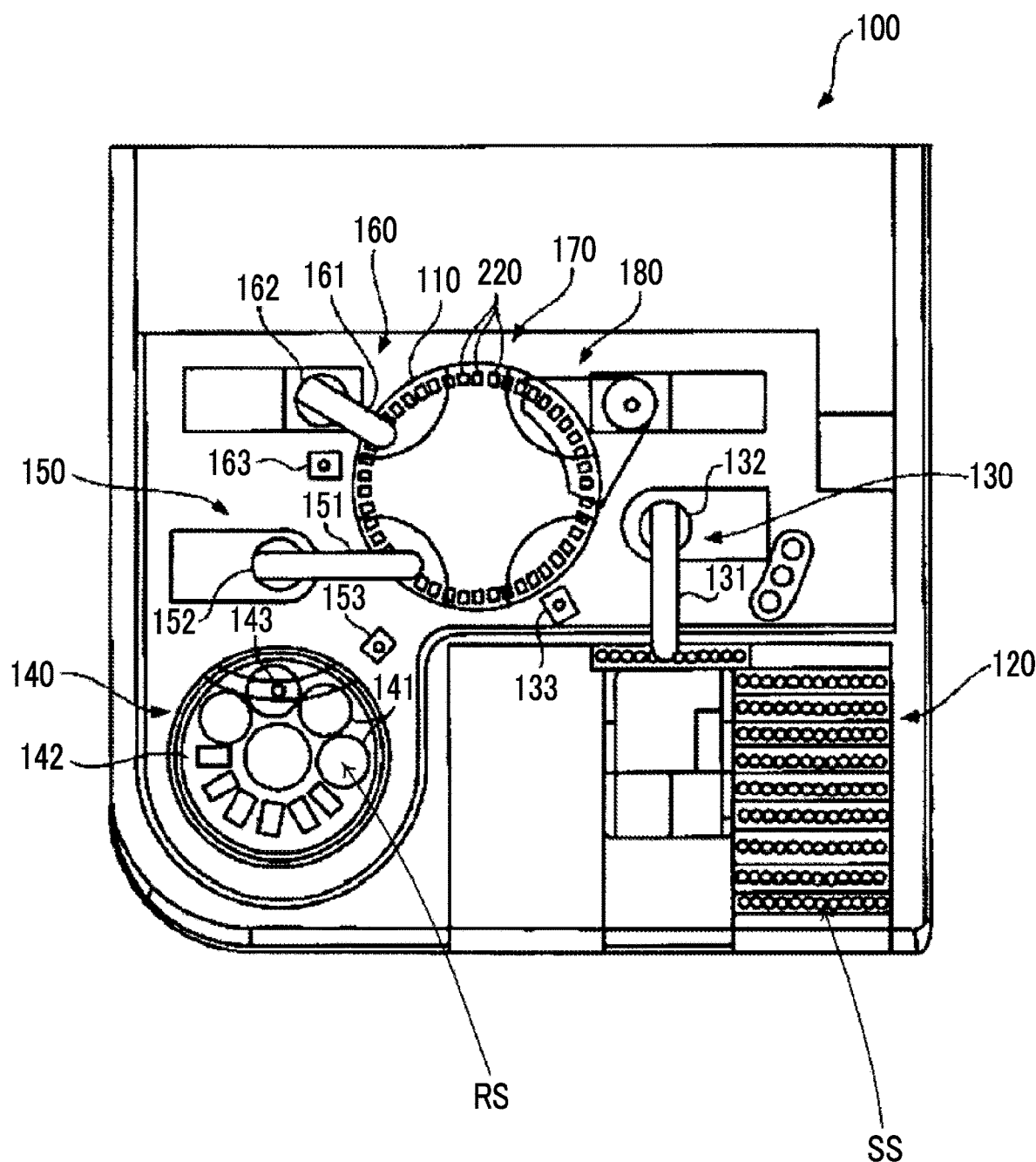
FIG. 1 is a schematic diagram of a biochemical analyzer that includes a solution jetting device according to an embodiment of the invention.

100: biochemical analyzer
110: turntable
120: specimen supply section
130: specimen sampling section
131: specimen pipette
132: rotating shaft
133: washing unit
140: reagent cooling box
141: reagent container
142: upper lid
143: suction port
150: reagent sampling section
151: reagent pipette
152: rotating shaft
153: washing unit
160: agitating section
161: agitator
162: rotating shaft
163: washing unit
170: reaction section
180: washing section
201: syringe
202: plunger
203: first drive mechanism
211: first flow passage
212: first on-off valve
213: deaerator
220: reaction container
221: nozzle
222: second flow passage
223: second on-off valve
224: second drive mechanism
231: end face-position detecting unit
232: control unit
RS: reagent solution
SS: specimen solution

DESCRIPTION OF THE PREFERRED EMBODIMENTS

An embodiment of the invention will be described below with reference to the drawings.

FIG. 1 is a schematic diagram of a biochemical analyzer that includes a solution jetting device according to an embodiment of the invention.

A biochemical analyzer 100 is provided with a turntable 110, and a plurality of reaction containers 220 are arranged in a circular shape on the turntable 110.

A specimen supply section 120, a specimen sampling section 130, a reagent cooling box 140, a reagent sampling section 150, an agitating section 160, a reaction section 170, and a washing section 180 are provided around the turntable 110.

Specimen containers, which contain various solutions (hereinafter, referred to as specimen solutions) SS including biological samples (for example, blood, urine, excreta, or the like of the human body), are arranged on the specimen supply section 120. The specimen sampling section 130 includes a specimen pipette 131 that sucks the specimen solution SS from the specimen container and injects the specimen solution SS into a reaction container programmed in advance among the plurality of reaction containers 220 arranged on the turntable 110.

The specimen pipette 131 is moved rotationally about a rotating shaft 132 so as to reciprocate between the specimen supply section 120, a washing unit 133, and the reaction containers 220 arranged on the turntable 110. The specimen pipette 131 sucks specimen solutions SS from the specimen containers, which are arranged on the specimen supply section 120, and injects the solutions into the reaction containers 220 arranged on the turntable 110. The specimen pipette 131 is washed by the washing unit 133 to suck the next specimen solution SS.

Further, the reagent cooling box 140 stores reagent containers 141 that contain solutions (hereinafter, referred to as reagent solutions) RS including reagents used to react with the biological samples, and keeps the reagent containers 141 at a predetermined cooling temperature. An upper lid 142 of the reagent cooling box 140 is provided with a suction port 143. The reagent containers 141 form a solution container.

Examples of the reagent solution RS include a colloidal solution including an antibody. The reagent containers 141 stored in the reagent cooling box 140 are placed on the turntable and are rotatable, and the turntable is rotated so that a reagent container 141 containing a desired reagent solution RS is disposed below the suction port 143.

The reagent sampling section 150 is provided with a reagent pipette 151 that is a solution jetting device. The reagent pipette 151 is moved rotationally about a rotating shaft 152 so as to reciprocate between the suction port 143 of the reagent cooling box 140, a washing unit 153, and the reaction containers 220 arranged on the turntable 110. The reagent pipette 151 inserts a probe (not shown), which is provided at a distal end thereof, into the suction port 143 of the upper lid 142 of the reagent cooling box 140; sucks a reagent solution RS contained in the reagent container 141 positioned below the suction port 143; and injects the sucked reagent solution RS into the reaction containers 220 arranged on the turntable 110. The reagent pipette 151 is washed by the washing unit 153 to suck the next reagent solution RS.

The agitating section 160 is provided with an agitator 161 that includes a rod-like agitating element (not shown) at a distal end thereof. The agitator 161 is moved rotationally about a rotating shaft 162 so as to reciprocate between the reaction containers 220, which are arranged on the turntable 110, and a washing unit 163. The agitator 161 inserts the agitating element into a reaction container 220, and agitates and mixes the specimen solution SS, which is injected into the reaction container 220, and the reagent solution RS. The agitator 161 is washed by the washing unit 163 so that the agitating element provided at the distal end of the agitator 161 agitates and mixes a specimen solution and a reagent solution in the next reaction container.

A measuring instrument (not shown), which performs measurement for density detection of the color reaction of a sample solution formed of the specimen solution SS and the reagent solution RS agitated and mixed in the reaction container 220, is disposed in the reaction section 170. Accordingly, the biochemical analysis of a specimen is performed.

The reaction container 220 in which measurement performed by the reaction section 170 provided on the turntable 110 has been completed is washed in the washing section 180, and is reused for the biochemical analysis of the next specimen.

A plurality of operation sequences is prepared in the biochemical analyzer 100. For example, in an operation sequence in a case in which general biochemical analysis is performed, first, a reagent solution RS is dispensed to the reaction container 220 arranged on the turntable 110 and temperature is adjusted for 5 minutes in this state so that the reagent solution RS is stabilized at a predetermined temperature. Then, a specimen solution SS is dispensed to the above-mentioned reaction container 220, a reagent solution RS is further dispensed to the reaction container 220, the solutions are agitated, and measurement is performed. At last, the reaction container 220 is washed. About 10 minutes are required for these operations. This operation sequence is performed in parallel for the plurality of reaction containers 220 placed on the turntable 110.

Further, for example, in an operation sequence at the time of a fecal occult blood test, the dispensation of a reagent solution RS, the dispensation of a specimen solution SS, and the re-dispensation of the reagent solution RS are performed in this order, and agitation, measurement, and washing are performed. This operation sequence ends in about 6 minutes per specimen. Even in this case, this operation sequence is performed in parallel for the plurality of reaction containers 220 placed on the turntable 110.

In the biochemical analyzer 100 shown in FIG. 1, the switching of an operation sequence is performed by an operator's manual operation. However, in addition to this, a specimen container corresponding to the type of a specimen may be used to detect the type of the specimen container and to switch an operation sequence.

Figure 2:
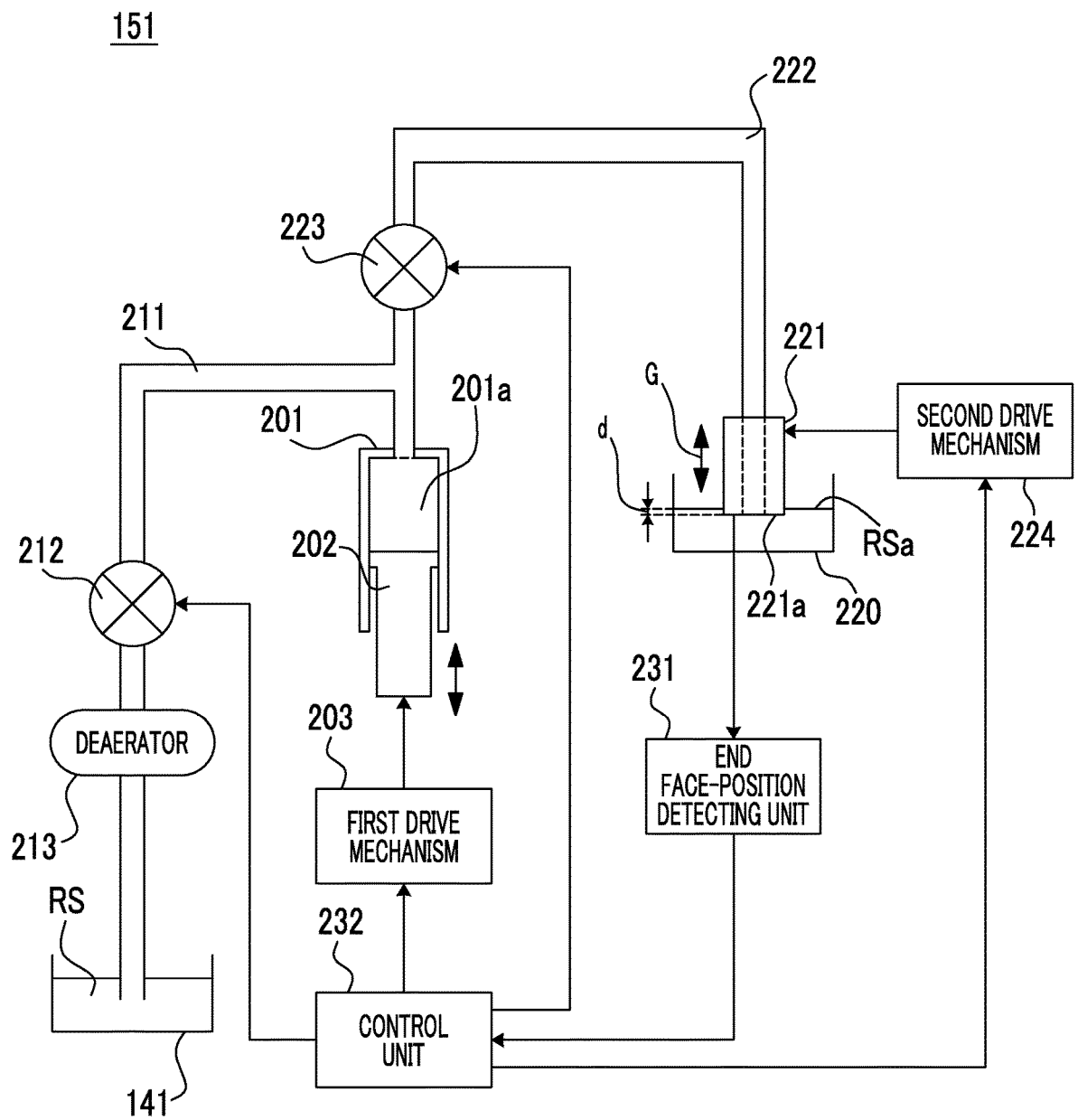
FIG. 2 is a diagram showing the configuration of a reagent pipette as the solution jetting device of the biochemical analyzer shown in FIG. 1.

FIG. 2 is a diagram showing the configuration of the reagent pipette 151 of the biochemical analyzer 100 shown in FIG. 1. The reagent pipette 151 forms a solution jetting device.

The reagent pipette 151 includes a syringe 201, a plunger 202, a first drive mechanism 203, a first flow passage 211, a first on-off valve 212, a deaerator 213, a nozzle 221, a second flow passage 222, a second on-off valve 223, a second drive mechanism 224, an end face-position detecting unit 231, and a control unit 232.

The syringe 201 is a cylindrical member including a hollow portion 201a. The plunger 202 is a movable member that is movably fitted to the hollow portion 201a of the syringe 201. The hollow portion 201a of the syringe 201 is provided with a through hole that is used to be connected to each of the first flow passage 211 and the second flow passage 222.

The first drive mechanism 203 is a mechanism that is used to move the plunger 202 in the hollow portion 201a.

The first flow passage 211 is a flow passage that connects the reagent container 141 to the hollow portion 201a of the syringe 201.

The first on-off valve 212 is a solenoid valve that is used to open and close the first flow passage 211.

The deaerator 213 is provided between the first on-off valve 212 and the reagent container 141 of the reagent cooling box 140, and has a function to remove bubbles present in the reagent solution RS.

The nozzle 221 is a jetting tool that is used to jet the reagent solution RS to the inside of the reaction container 220. The inside of the reaction container 220 forms an objective region that is an object to which the reagent solution RS is to be jetted.

The second flow passage 222 is a flow passage that connects the hollow portion 201a of the syringe 201 to the nozzle 221.

The second on-off valve 223 is a solenoid valve that is used to open and close the second flow passage 222.

The second drive mechanism 224 is a mechanism that is used to move an end face 221a of the nozzle 221, which includes an outlet for the reagent solution RS, in the direction of gravity (a direction of an arrow G).

The end face-position detecting unit 231 is a functional block that detects the position of an end face 221a of the nozzle 221 relative to a liquid level RSa of the reagent solution RS present in the reaction container 220. The end face-position detecting unit 231 detects the position of the end face 221a relative to the liquid level RSa by analyzing a taken image that is obtained from the imaging of the reaction container 220. Alternatively, a plurality of contact sensors are arranged in the direction of gravity on the side surface of the nozzle 221, and the end face-position detecting unit 231 detects the position of the end face 221a relative to the liquid level RSa on the basis of information obtained from the plurality of contact sensors.

The control unit 232 includes one or a plurality of processors as a main component, and the control unit 232 controls the operations of the first drive mechanism 203, the first on-off valve 212, the second on-off valve 223, and the second drive mechanism 224 in a case in which one or the plurality of processors execute programs.

Control information is input to the control unit 232 from a host control unit (not shown) that controls the entire biochemical analyzer 100. The control unit 232 controls the amount of a reagent solution RS that is to be supplied to the nozzle 221 from the reagent containers 141 and a timing when a reagent solution RS is to be supplied to the nozzle 221 from the reagent containers 141 by controlling the operations of the first drive mechanism 203, the first on-off valve 212, and the second on-off valve 223 according to the control information.

Further, the control unit 232 controls the position of the end face 221a of the nozzle 221 relative to the reaction container 220 in the direction of gravity by controlling the operation of the second drive mechanism 224 according to the control information input from the host control unit (not shown). The position of the end face 221a of the nozzle 221 relative to the reaction container 220 in the direction of gravity is determined according to the shape and dimensions of the reaction container 220 and the target amount of a reagent solution RS to be jetted.

Furthermore, detection information, which is obtained from the end face-position detecting unit 231, is input to the control unit 232. The control unit 232 controls a timing when the jet of the reagent solution RS from the nozzle 221 is to be completed by controlling the operation of the first drive mechanism 203 on the basis of the detection information that is obtained from the end face-position detecting unit 231.

Moreover, the control unit 232 allows the deaerator 213 to be operated at regular intervals. In a case in which the deaerator 213 is operated, the reagent solution RS, which is sucked into the hollow portion 201a of the syringe 201, is circulated to the reagent container 141 through the first flow passage 211. Accordingly, the generation of the bubbles of dissolved oxygen can be prevented.

Figure 3A:
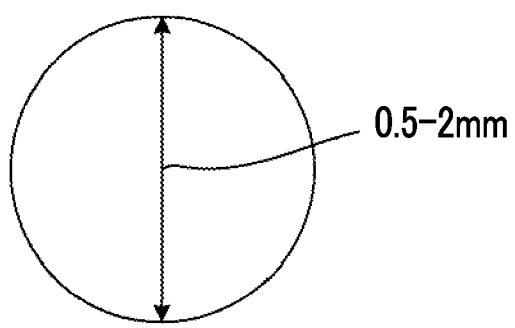
FIG. 3A is a diagram showing an example of the shape and dimensions of an end face of a nozzle as a jetting tool of the reagent pipette shown in FIG. 2.
Figure 3B:
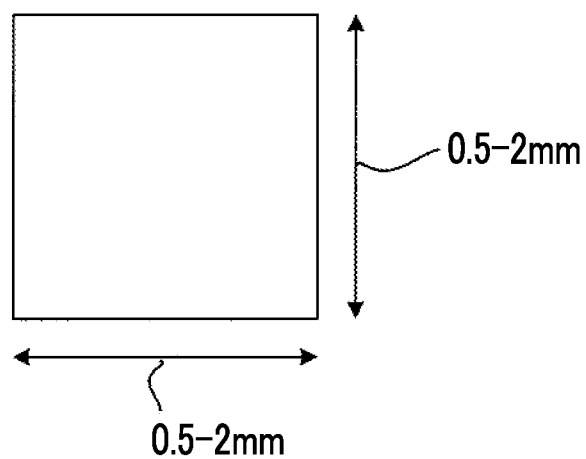
FIG. 3B is a diagram showing another example of the shape and dimensions of the end face of the nozzle.

Here, the shape and dimensions of the end face 221a of the nozzle 221 may be any shape and dimensions. However, in the following description, the diameter of the end face 221a is 0.5 mm or more and less than 2.0 mm in a case in which the shape of the end face 221a is a circular shape as illustrated in FIG. 3A. Further, the length of one side of the end face 221a is 0.5 mm or more and less than 2.0 mm in a case in which the shape of the end face 221a is a square shape as illustrated in FIG. 3B.

Next, a first operation mode of the reagent pipette 151 will be described with reference to FIGS. 4 to 8. The first drive mechanism 203, the second drive mechanism 224, the control unit 232, and the end face-position detecting unit 231 are not shown in FIGS. 4 to 8.

Figure 4:
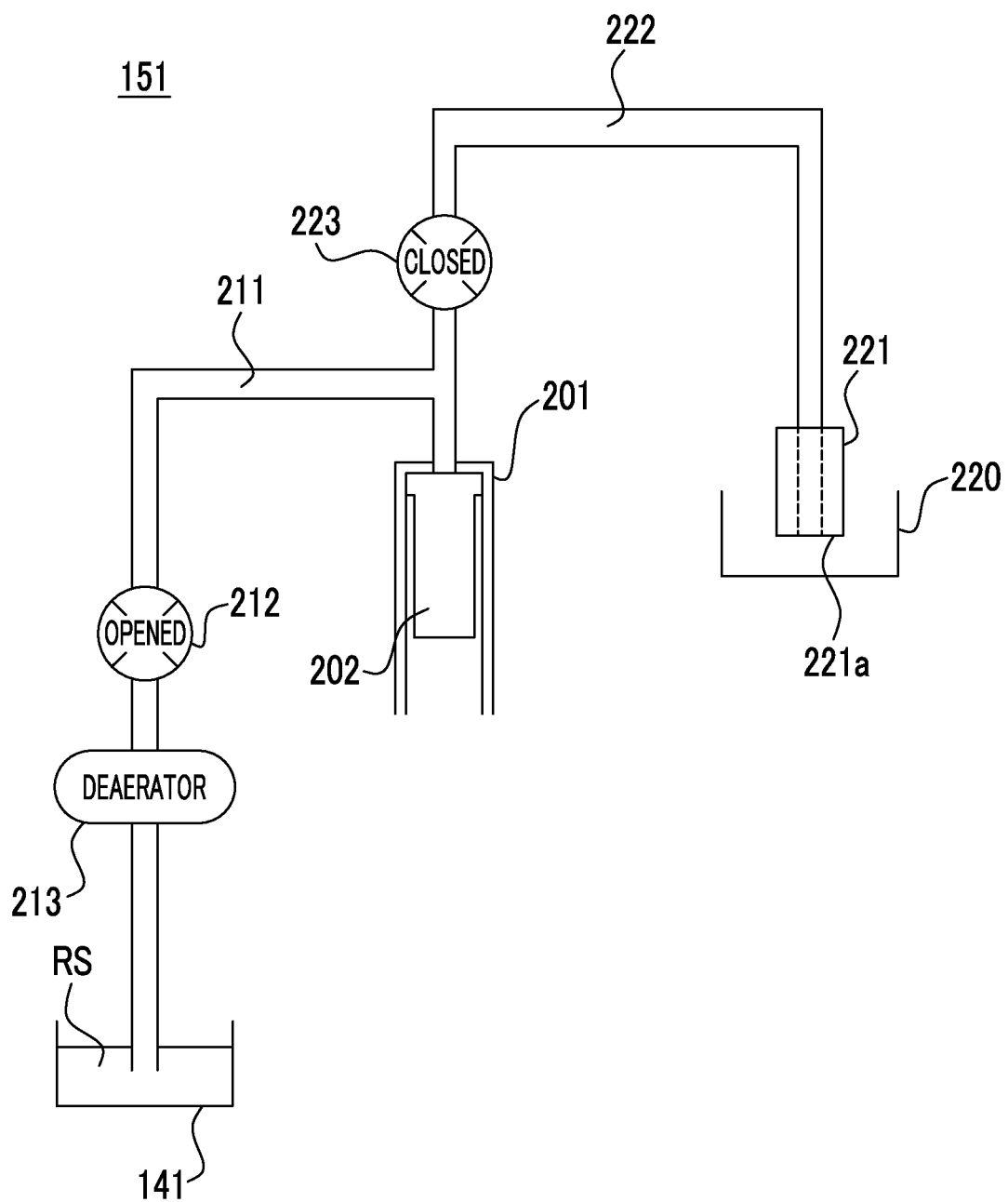
FIG. 4 is a diagram showing the main configuration of the reagent pipette shown in FIG. 2 and an initial state of a first operation mode of the reagent pipette.
Figure 5:
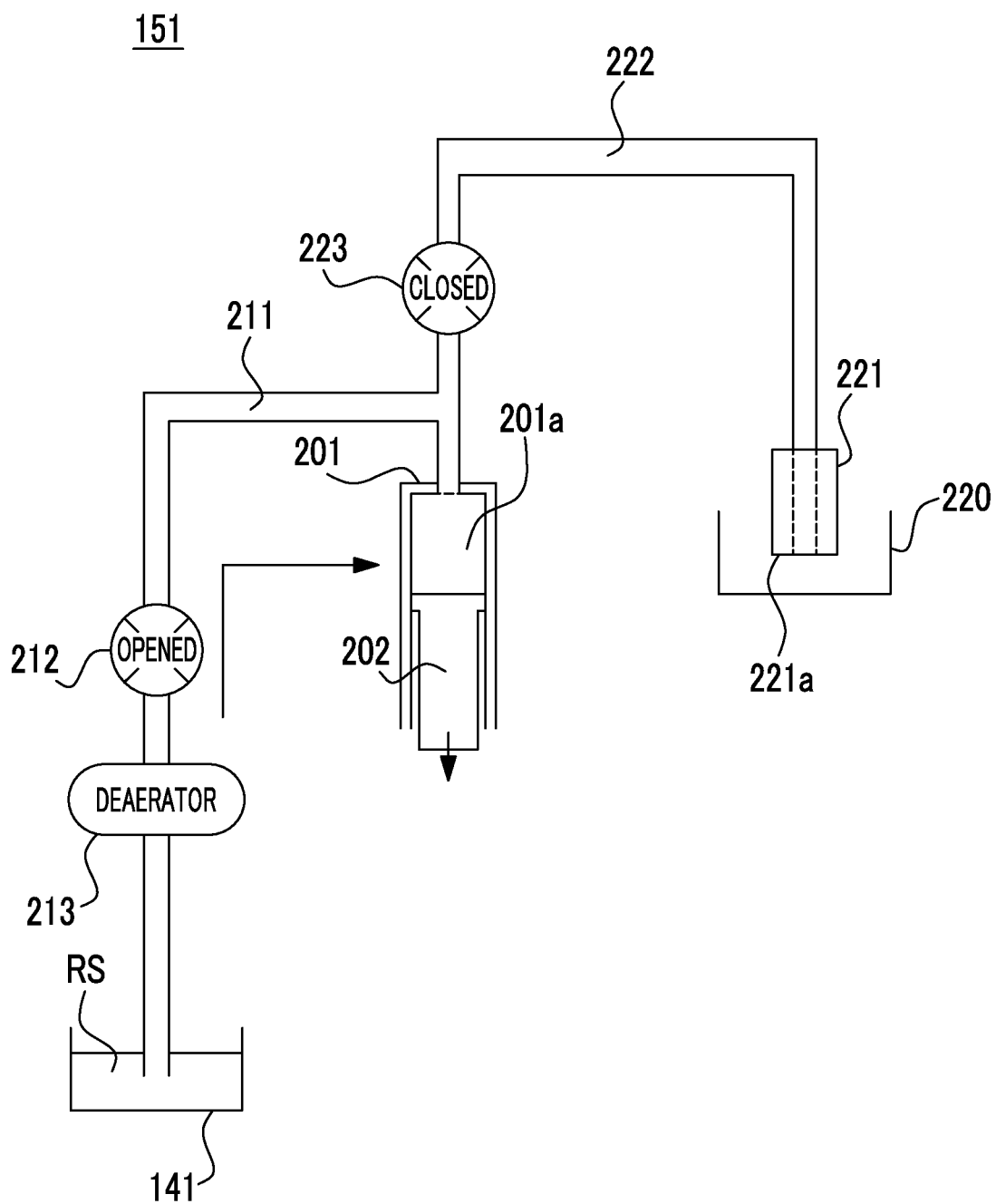
FIG. 5 is a diagram showing the main configuration of the reagent pipette and a state succeeding FIG. 4.

The control unit 232 performs first control for sucking the reagent solution RS into the hollow portion 201a of the syringe 201 from the reagent container 141 by moving the plunger 202 from the innermost portion of the syringe 201 (by moving the plunger 202 down in the example shown in FIGS. 4 and 5) in a state in which the first on-off valve 212 is opened and the second on-off valve 223 is closed as shown in FIGS. 4 and 5.

Figure 6:
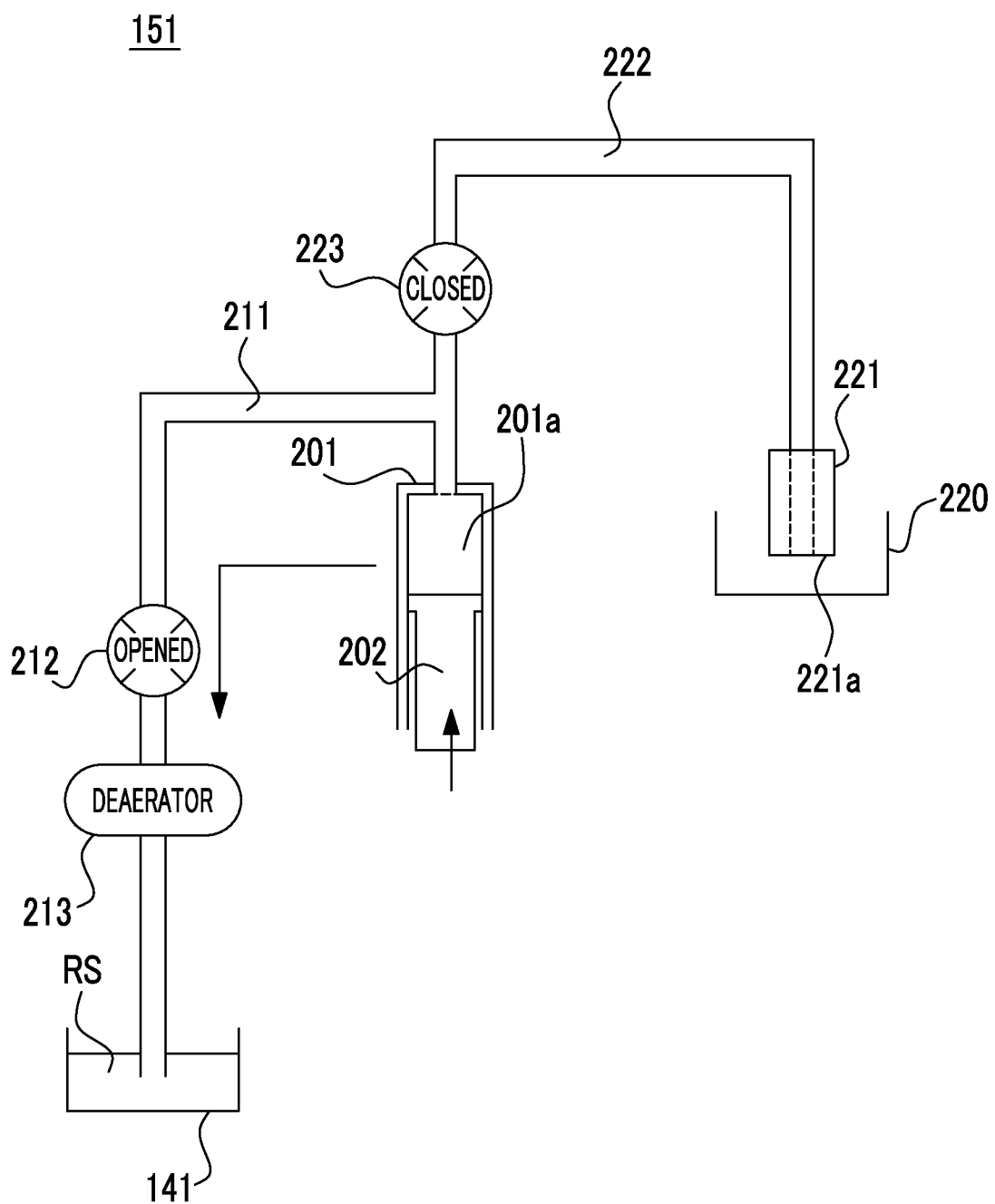
FIG. 6 is a diagram showing the main configuration of the reagent pipette and a state succeeding FIG. 5.

After that, the control unit 232 performs second control for discharging a part of the reagent solution RS, which is present in the hollow portion 201a of the syringe 201, to the first flow passage 211 by moving the plunger 202 in a direction opposite to the direction in the first control as shown in FIG. 6 (by moving the plunger 202 up in the example shown in FIG. 6). The moving distance of the plunger 202 in this case is specifically in the range of 0.1 to 3.0 mm, but is preferably in the range of 0.1 to 2.0 mm and more preferably in the range of 0.1 to 1.0 mm.

An error caused by the backlash of a syringe pump, which includes the syringe 201 and plunger 202, can be absorbed in a case in which the moving distance of the plunger 202 in the second control is set in the range of 0.1 to 3.0 mm. An error caused by the backlash can be more effectively absorbed in a case in which this range is set to the range of 0.1 to 2.0 mm, and an error caused by the backlash can be still more effectively absorbed in a case in which this range is set to the range of 0.1 to 1.0 mm.

Figure 7:
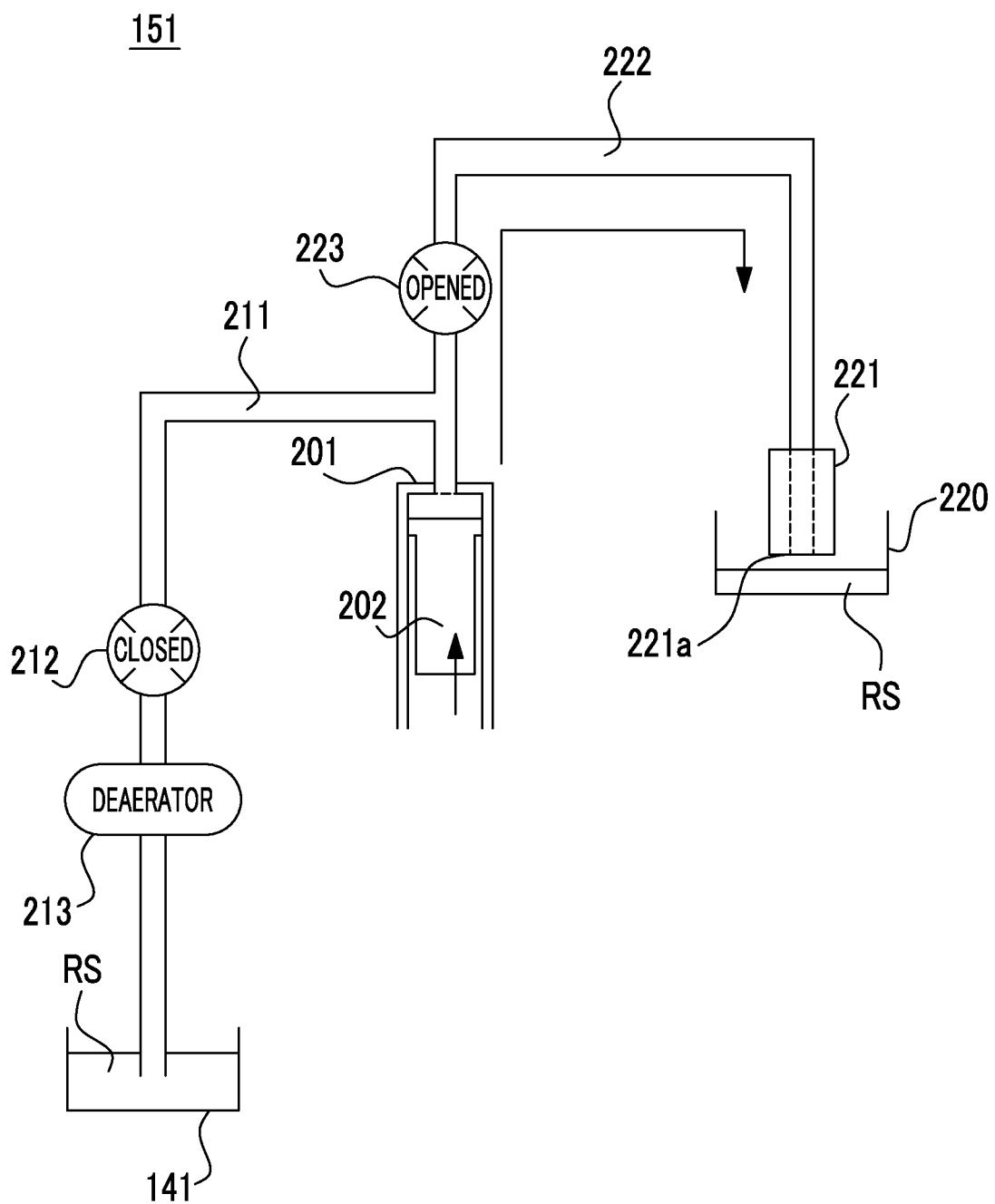
FIG. 7 is a diagram showing the main configuration of the reagent pipette and a state succeeding FIG. 6.

After that, the control unit 232 performs third control for discharging the reagent solution RS, which is present in the hollow portion 201a of the syringe 201, to the second flow passage 222 by further moving the plunger 202 (by moving the plunger 202 up in the example shown in FIG. 7) in a state in which the first on-off valve 212 is closed and the second on-off valve 223 is opened as shown in FIG. 7. The reagent solution RS is jetted into the reaction container 220 from the nozzle 221 by this operation.

Figure 8:
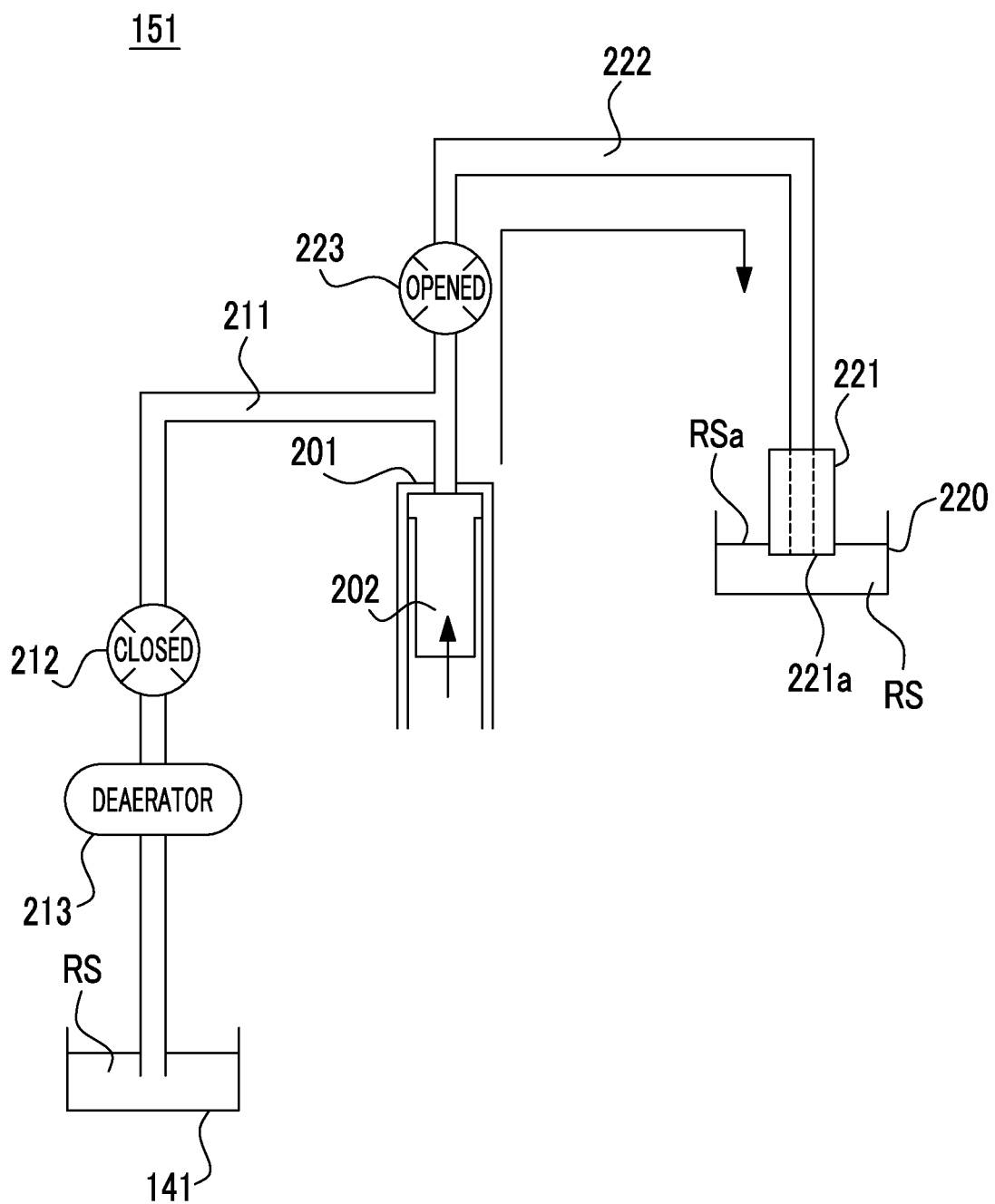
FIG. 8 is a diagram showing the main configuration of the reagent pipette and a state succeeding FIG. 7.

Then, the control unit 232 completes the jet of the reagent solution RS into the reaction container 220 in a state in which the end face 221a of the nozzle 221 is positioned in the reagent solution RS jetted into the reaction container 220 and a distance d between the end face 221a of the nozzle 221 and the surface of the reagent solution RS in the direction of gravity is in the range of 0.1 mm to 1.0 mm. FIG. 8 illustrates a state at this time. The amount of the reagent solution RS to be jetted into the reaction container 220 by the third control is, for example, 10 µl (microliter), and the amount of the reagent solution RS to be discharged to the first flow passage 211 by the second control is, for example, 3 µl.

As described above, the reagent pipette 151 completes the jet of the reagent solution RS in a state in which the end face 221a of the nozzle 221 is positioned in the reagent solution RS and the distance d between the end face 221a of the nozzle 221 and the surface of the reagent solution RS in the direction of gravity is in the range of 0.1 mm to 1.0 mm.

Since the distance d is set to 0.1 mm or more, the amount of the solution to be torn between the end face 221a of the nozzle 221 and the surface of the reagent solution RS can be stabilized in a case in which the end face 221a of the nozzle 221 is to be separated from the reagent solution RS present in the reaction container 220. Further, since the distance d is set to 1.0 mm or less, the amount of the solution to adhere to the side surface of the nozzle 221 can be stabilized in a case in which the end face 221a of the nozzle 221 is to be separated from the reagent solution RS present in the reaction container 220.

From the above description, according to the reagent pipette 151, it is possible to improve analysis performance for a biological sample by controlling the amount of the reagent solution RS to be jetted with high accuracy. According to the first operation mode, it is possible to control the amount of the reagent solution RS, which is to be jetted into the reaction container 220, in a very small range of 5 ml or less with high accuracy.

Further, according to the reagent pipette 151, it is possible to remove an error, which is caused by the backlash of the syringe pump, in the amount of the reagent solution RS to be jetted by performing the second control, and to control the amount of the reagent solution RS to be jetted with high accuracy by a combination of the second control and the third control.

Next, a second operation mode of the reagent pipette 151 will be described with reference to FIGS. 9 to 13. The first drive mechanism 203, the second drive mechanism 224, the control unit 232, and the end face-position detecting unit 231 are not shown in FIGS. 9 to 13.

Figure 9:
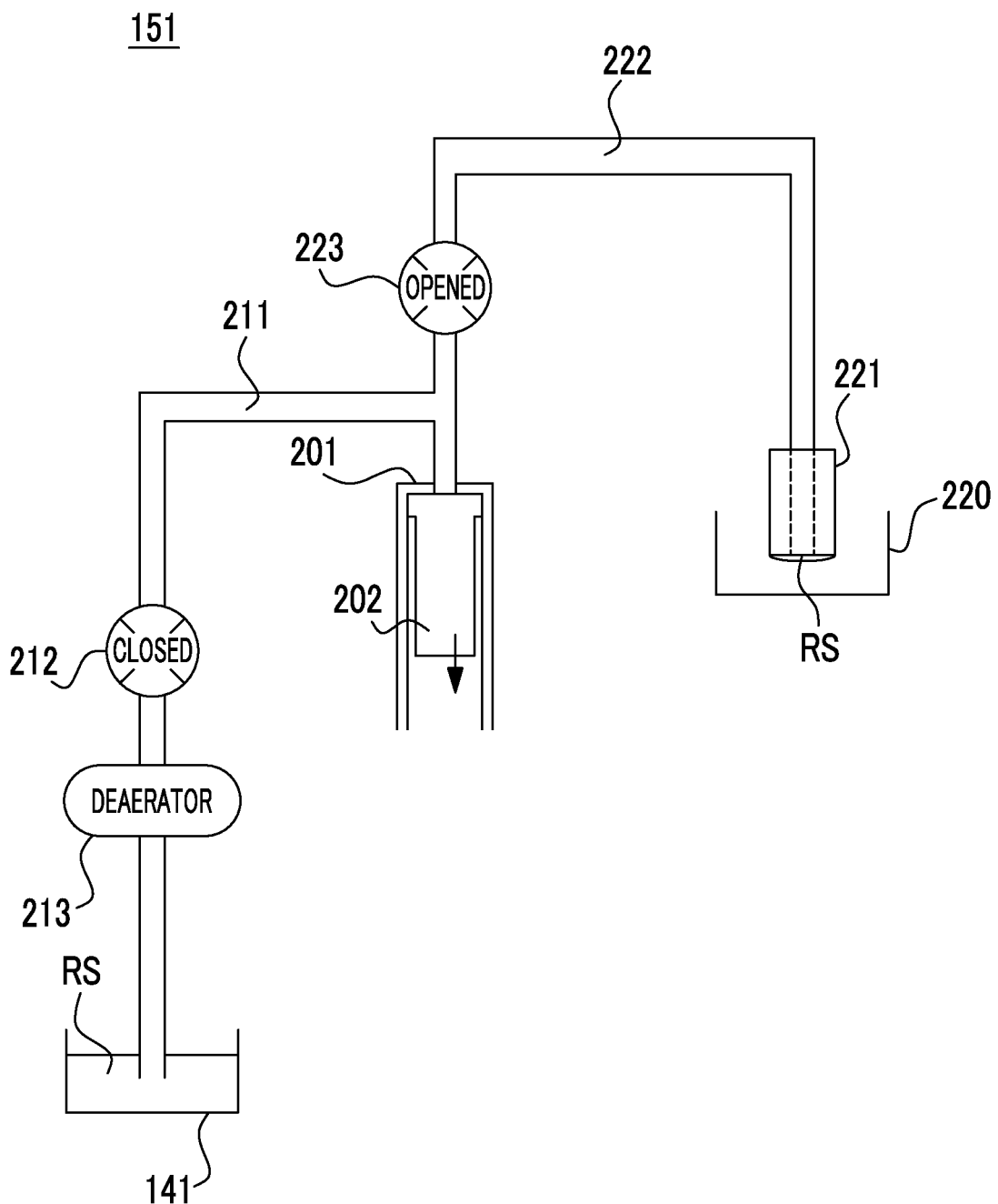
FIG. 9 is a diagram showing the main configuration of the reagent pipette shown in FIG. 2 and an initial state of a second operation mode of the reagent pipette.
Figure 10:
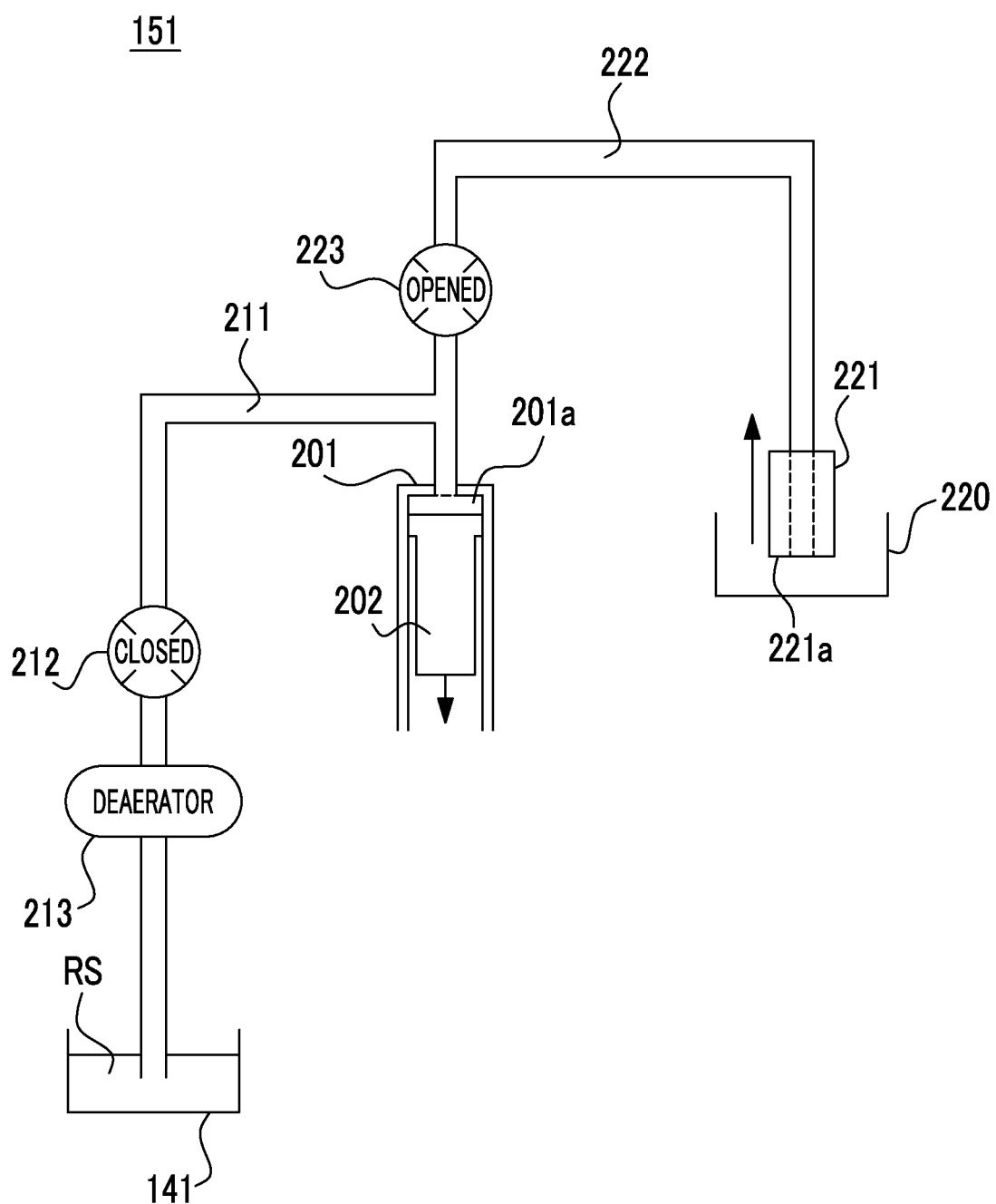
FIG. 10 is a diagram showing the main configuration of the reagent pipette and a state succeeding FIG. 9.

In the second operation mode, first, the control unit 232 performs first control for sucking the residual solution of the reagent solution RS, which remains on the end face 221a of the nozzle 221 having been subjected to the previous jetting, toward the hollow portion 201a of the syringe 201 from the second flow passage 222 by moving the plunger 202 from the innermost portion of the syringe 201 (by moving the plunger 202 down in the example shown in FIGS. 9 and 10) in a state in which the first on-off valve 212 is closed and the second on-off valve 223 is opened as shown in FIGS. 9 and 10.

The moving distance of the plunger 202 at this time is specifically in the range of 0.1 to 3.0 mm. This moving distance is preferably in the range of 0.1 to 2.0 mm and more preferably in the range of 0.1 to 1.0 mm.

An error caused by the backlash of the syringe pump, which includes the syringe 201 and plunger 202, can be absorbed in a case in which the moving distance of the plunger 202 in the first control is in the range of 0.1 to 3.0 mm. An error caused by the backlash can be more effectively absorbed in a case in which this range is set to the range of 0.1 to 2.0 mm, and an error caused by the backlash can be still more effectively absorbed in a case in which this range is set to the range of 0.1 to 1.0 mm. Further, since the pool of the reagent solution RS, which has been jetted in the previous time, on the end face 221a of the nozzle 221 can be removed and the drying of the reagent solution RS can be prevented by the first control, an error in the amount of the reagent solution RS to be jetted can be removed.

Figure 11:
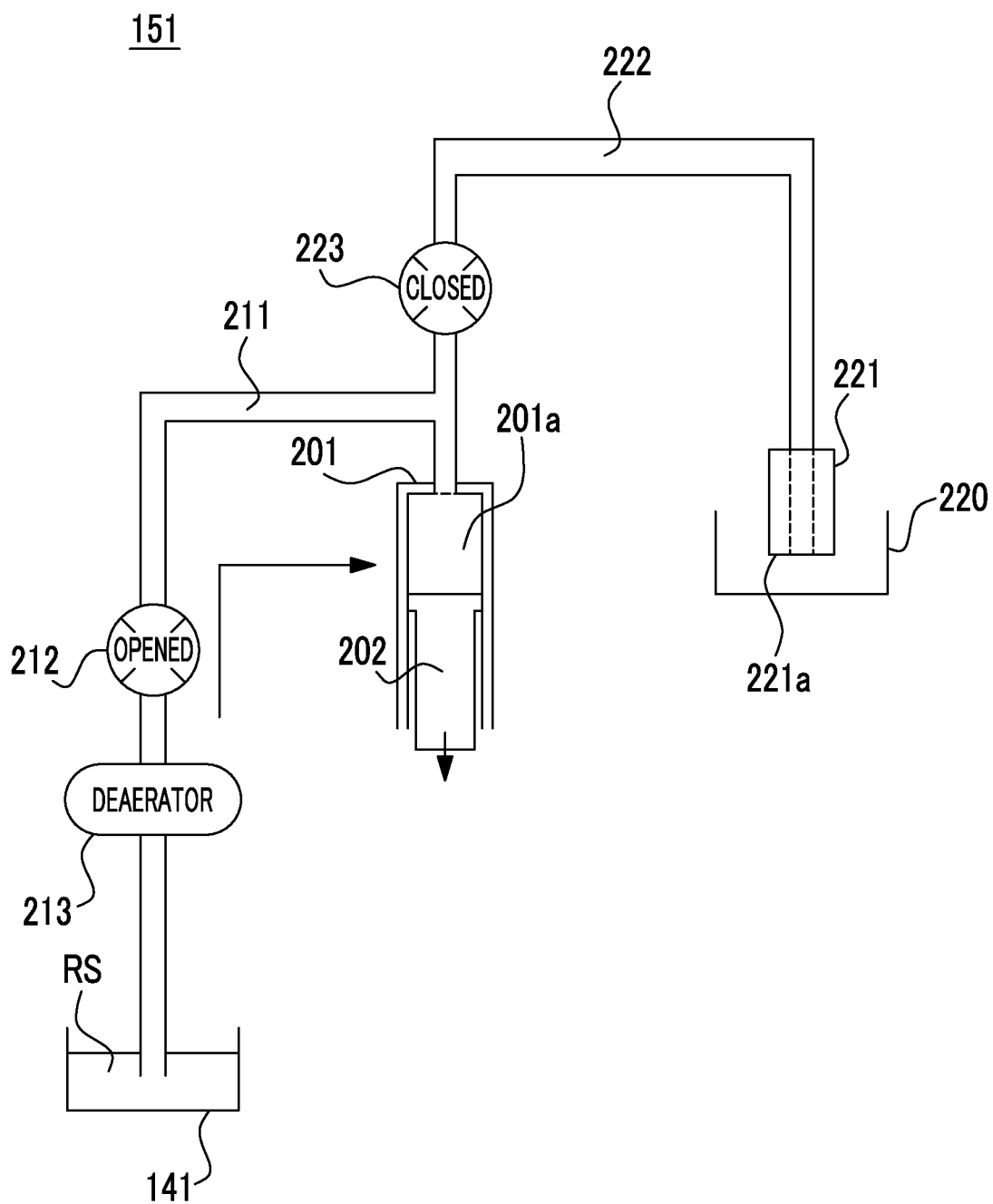
FIG. 11 is a diagram showing the main configuration of the reagent pipette and a state succeeding FIG. 10.

After that, the control unit 232 performs second control for sucking the reagent solution RS into the hollow portion 201a of the syringe 201 from the reagent container 141 by moving the plunger 202 in the same direction as that in the first control (by moving the plunger 202 down in the example shown in FIG. 11) in a state in which the first on-off valve 212 is opened and the second on-off valve 223 is closed as shown in FIG. 11.

Figure 12:
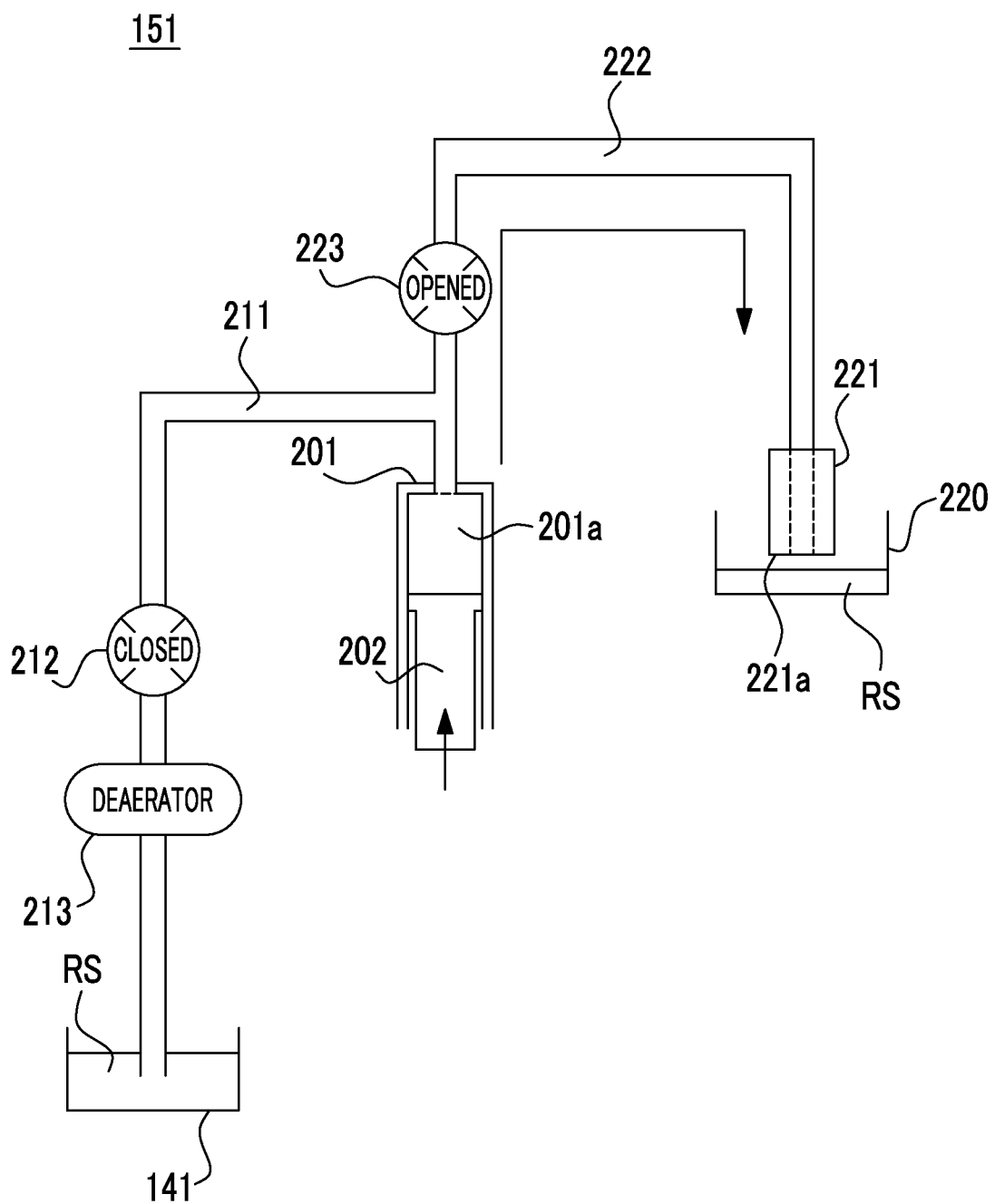
FIG. 12 is a diagram showing the main configuration of the reagent pipette and a state succeeding FIG. 11.

Next, the control unit 232 performs third control for discharging the reagent solution RS, which is present in the hollow portion 201a of the syringe 201, to the second flow passage 222 by moving the plunger 202 in a direction opposite to the direction in the first control (by moving the plunger 202 up in the example shown in FIG. 12) in a state in which the first on-off valve 212 is closed and the second on-off valve 223 is opened as shown in FIG. 12. The reagent solution RS is jetted into the reaction container 220 from the nozzle 221 by this operation.

Figure 13:
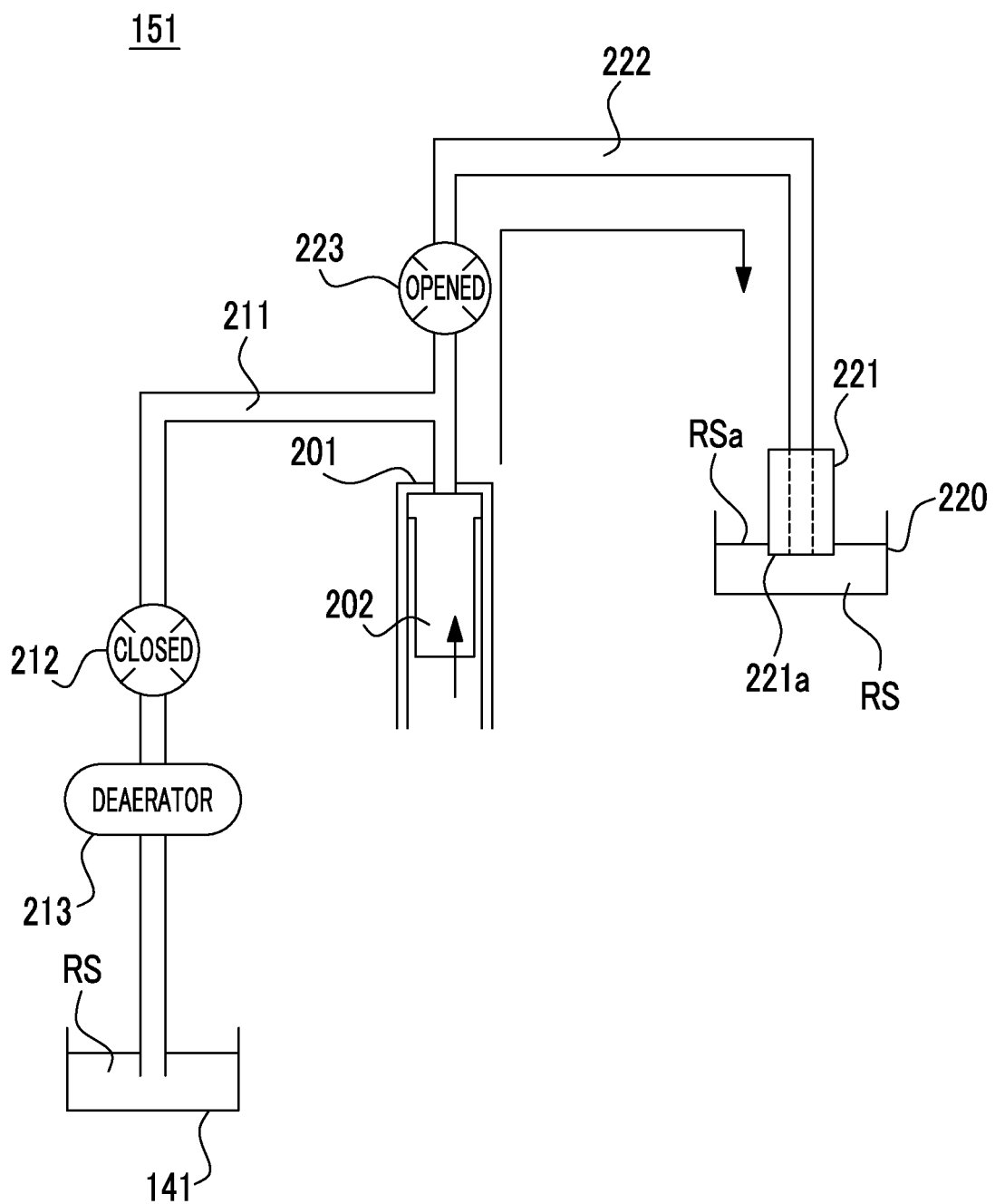
FIG. 13 is a diagram showing the main configuration of the reagent pipette and a state succeeding FIG. 12.

Then, the control unit 232 completes the jet of the reagent solution RS into the reaction container 220 in a state in which the end face 221a of the nozzle 221 is positioned in the reagent solution RS jetted into the reaction container 220 as an objective region and a distance d between the end face 221a of the nozzle 221 and the surface of the reagent solution RS in the direction of gravity is in the range of 0.1 mm to 1.0 mm. FIG. 13 illustrates a state at this time.

As described above, the reagent pipette 151 completes the jet of the reagent solution RS in a state in which the end face 221a of the nozzle 221 is positioned in the reagent solution RS and the distance d between the end face 221a of the nozzle 221 and the surface of the reagent solution RS in the direction of gravity is in the range of 0.1 mm to 1.0 mm. Further, an error caused by the backlash can be removed by the first control. For this reason, as in the first operation mode, it is possible to improve analysis performance for a biological sample by controlling the amount of the reagent solution RS to be jetted with high accuracy. Even in the second operation mode, it is possible to control the amount of the reagent solution RS, which is to be jetted into the reaction container 220, in a very small range of 5 ml or less with high accuracy.

In the third control of the first and second operation modes, only the operation of the first drive mechanism 203 is controlled on the basis of the position of the liquid level RSa of the reagent solution RS. However, third control may be performed through the operation of the first drive mechanism 203 while the position of the end face 221a of the nozzle 221 in the direction of gravity is controlled through the control of the operation of the second drive mechanism 224.

Furthermore, an example in which the solution jetting device of the invention is applied to the reagent pipette 151 has been described in this embodiment, but the invention is not limited thereto and can also be applied to the specimen pipette 131. In this case, the specimen container, which contains the specimen solution SS, forms the solution container.

Moreover, each of the first on-off valve 212 and the second on-off valve 223 is a solenoid valve in this embodiment, but is not limited thereto and may be an on-off valve that is mechanically driven.

Further, an objective region to which a solution is to be jetted from the nozzle 221 has been a container in this embodiment, but the surface of a substrate may be applied as an objective region. In a case in which the surface of a substrate is applied as an objective region, a biological sample can be applied to, for example, an antibody or the like present on a substrate while the amount of the biological sample to be jetted can be controlled in a very small range of 5 ml or less with high accuracy.

The followings will be disclosed in this specification as described above.

A disclosed solution jetting device comprises: a cylindrical member; a movable member that is movably fitted to a hollow portion of the cylindrical member; a first drive mechanism that moves the movable member; a first flow passage that connects a solution container, in which a solution including a biological sample or a solution including a reagent used to react with a biological sample is contained, to the hollow portion; an openable and closable first on-off valve that is provided on the first flow passage; a jetting tool that jets the solution to an objective region; a second flow passage that connects the hollow portion to the jetting tool; an openable and closable second on-off valve that is provided on the second flow passage; a second drive mechanism that moves an end face, which includes an outlet for the solution, of the jetting tool in a direction of gravity; and a control unit that jets the solution to the objective region from the jetting tool by performing first control, second control, and third control. The control unit performs the first control for sucking the solution into the hollow portion from the solution container by moving the movable member through the first drive mechanism in a state in which the first on-off valve is opened and the second on-off valve is closed, performs the second control for discharging a part of the solution, which is present in the hollow portion, to the first flow passage by moving the movable member through the first drive mechanism, and performs the third control for discharging the solution, which is present in the hollow portion, to the second flow passage by moving the movable member through the first drive mechanism in a state in which the first on-off valve is closed and the second on-off valve is opened. The control unit completes the jet of the solution to the objective region in a state in which the end face, which includes the outlet for the solution, of the jetting tool is positioned in the solution jetted to the objective region and a distance between the end face and a surface of the solution in the direction of gravity is in the range of 0.1 mm to 1.0 mm.

In the disclosed solution jetting device, a moving distance of the movable member, which is moved in the second control by the control unit, is in the range of 0.1 mm to 3.0 mm.

A disclosed solution jetting device comprises: a cylindrical member; a movable member that is movably fitted to a hollow portion of the cylindrical member; a first drive mechanism that moves the movable member; a first flow passage that connects a solution container, in which a solution including a biological sample or a solution including a reagent used to react with a biological sample is contained, to the hollow portion; an openable and closable first on-off valve that is provided on the first flow passage; a jetting tool that jets the solution to an objective region; a second flow passage that connects the hollow portion to the jetting tool; an openable and closable second on-off valve that is provided on the second flow passage; a second drive mechanism that moves an end face, which includes an outlet for the solution, of the jetting tool in a direction of gravity; and a control unit that jets the solution to the objective region from the jetting tool by performing first control, second control, and third control. The control unit performs the first control for sucking the solution toward the hollow portion from the second flow passage by moving the movable member through the first drive mechanism in a state in which the first on-off valve is closed and the second on-off valve is opened, performs the second control for sucking the solution into the hollow portion from the solution container by moving the movable member through the first drive mechanism in a state in which the first on-off valve is opened and the second on-off valve is closed, and performs the third control for discharging the solution, which is present in the hollow portion, to the second flow passage by moving the movable member through the first drive mechanism in a state in which the first on-off valve is closed and the second on-off valve is opened. The control unit completes the jet of the solution to the objective region in a state in which the end face, which includes the outlet for the solution, of the jetting tool is positioned in the solution jetted to the objective region and a distance between the end face and a surface of the solution in a direction of gravity is in the range of 0.1 mm to 1.0 mm.

In the disclosed solution jetting device, a moving distance of the movable member, which is moved in the first control by the control unit, is in the range of 0.1 mm to 3.0 mm.

In the disclosed solution jetting device, the amount of the solution to be jetted to the objective region by the third control is 5 ml or less.

In the disclosed solution jetting device, the objective region is an inside of the container.

In the disclosed solution jetting device, the end face of the jetting tool has the shape of a square of which the length of one side is 0.5 mm or more and less than 2.0 mm or has the shape of a circle of which the diameter is 0.5 mm or more and less than 2.0 mm.

In the disclosed solution jetting device, the solution is a colloidal solution including an antibody.

A disclosed method of controlling the jet of a solution is a method of controlling the jet of a solution by a device including a first drive mechanism that moves a movable member movably fitted to a hollow portion of a cylindrical member, a first flow passage that connects a solution container, in which a solution including a biological sample or a solution including a reagent used to react with a biological sample is contained, to the hollow portion, an openable and closable first on-off valve that is provided on the first flow passage, a jetting tool that jets the solution to an objective region, a second flow passage that connects the hollow portion to the jetting tool, an openable and closable second on-off valve that is provided on the second flow passage, and a second drive mechanism that moves an end face, which includes an outlet for the solution, of the jetting tool in a direction of gravity. The method comprises: a first step of sucking the solution into the hollow portion from the solution container by moving the movable member through the first drive mechanism in a state in which the first on-off valve is opened and the second on-off valve is closed; a second step of discharging a part of the solution, which is present in the hollow portion, to the first flow passage by moving the movable member through the first drive mechanism, after the first step; and a third step of discharging the solution, which is present in the hollow portion, to the second flow passage and jetting the solution to the objective region from the jetting tool by moving the movable member through the first drive mechanism in a state in which the first on-off valve is closed and the second on-off valve is opened, after the second step. In the third step, the jet of the solution to the objective region is completed in a state in which the end face, which includes the outlet for the solution, of the jetting tool is positioned in the solution jetted to the objective region and a distance between the end face and a surface of the solution in the direction of gravity is in the range of 0.1 mm to 1.0 mm.

In the disclosed method of controlling the jet of a solution, a moving distance of the movable member, which is moved in the second step, is in the range of 0.1 mm to 3.0 mm.

A disclosed method of controlling the jet of a solution is a method of controlling the jet of a solution by a device including a first drive mechanism that moves a movable member movably fitted to a hollow portion of a cylindrical member, a first flow passage that connects a solution container, in which a solution including a biological sample or a solution including a reagent used to react with a biological sample is contained, to the hollow portion, an openable and closable first on-off valve that is provided on the first flow passage, a jetting tool that jets the solution to an objective region, a second flow passage that connects the hollow portion to the jetting tool, an openable and closable second on-off valve that is provided on the second flow passage, and a second drive mechanism that moves an end face, which includes an outlet for the solution, of the jetting tool in a direction of gravity. The method comprises: a first step of sucking the solution toward the hollow portion from the second flow passage by moving the movable member through the first drive mechanism in a state in which the first on-off valve is closed and the second on-off valve is opened; a second step for sucking the solution into the hollow portion from the solution container by moving the movable member through the first drive mechanism in a state in which the first on-off valve is opened and the second on-off valve is closed, after the first step; and a third step of discharging the solution, which is present in the hollow portion, to the second flow passage and jetting the solution to the objective region from the jetting tool by moving the movable member through the first drive mechanism in a state in which the first on-off valve is closed and the second on-off valve is opened, after the second step. In the third step, the jet of the solution to the objective region is completed in a state in which the end face, which includes the outlet for the solution, of the jetting tool is positioned in the solution jetted to the objective region and a distance between the end face and a surface of the solution in the direction of gravity is in the range of 0.1 mm to 1.0 mm.

In the disclosed method of controlling the jet of a solution, a moving distance of the movable member, which is moved in the first step, is in the range of 0.1 mm to 3.0 mm.

In the disclosed method of controlling the jet of a solution, the amount of the solution to be jetted to the objective region in the third step is 5 ml or less.

In the disclosed method of controlling the jet of a solution, the objective region is an inside of the container.

In the disclosed method of controlling the jet of a solution, the end face of the jetting tool has the shape of a square of which the length of one side is 0.5 mm or more and less than 2.0 mm or has the shape of a circle of which the diameter is 0.5 mm or more and less than 2.0 mm.

In the disclosed method of controlling the jet of a solution, the solution is a colloidal solution including an antibody.

According to the invention, it is possible to improve analysis performance for a biological sample by controlling the amount of a biological sample or a solution, which includes a reagent used to react with a biological sample, to be jetted with high accuracy.

The invention has been described above using a specific embodiment, but the invention is not limited to this embodiment and can have various modifications without departing from the disclosed scope of the invention.

This application is based on Japanese Patent Application (JP2016-056949A) filed Mar. 22, 2016, the contents of which are incorporated herein by reference.

What is claimed is:

1. A solution jetting device comprising:
a cylindrical member;
a movable member that is movably fitted to a hollow portion of the cylindrical member;
a first drive mechanism that moves the movable member;
a first flow passage that connects a solution container, in which a solution comprising a biological sample or comprising a reagent to be reacted with a biological sample is contained, to the hollow portion;
an openable and closable first on-off valve that is provided on the first flow passage;
a jetting tool that jets the solution to an objective region;
a second flow passage that connects the hollow portion to the jetting tool;
an openable and closable second on-off valve that is provided on the second flow passage;
a second drive mechanism that moves an end face, which includes an outlet for the solution, of the jetting tool in a direction of gravity;
a detector configured to detect a distance between the end face of the jetting tool and a liquid level surface of the jetted solution in the objective region in the direction of gravity; and
a processor configured to control the jetting tool to jet the solution to the objective region by performing first control, second control and third control in this order, wherein the processor performs the first control for sucking the solution into the hollow portion from the solution container by moving the movable member through the first drive mechanism in a state in which the first on-off valve is opened and the second on-off valve is closed, performs the second control for discharging a part of the solution, which is present in the hollow portion, to the first flow passage by moving the movable member through the first drive mechanism, and performs the third control for discharging another part of the solution, which is present in the hollow portion, to the second flow passage by moving the movable member through the first drive mechanism in a state in which the first on-off valve is closed and the second on-off valve is opened,
wherein the processor is configured to control the jetting tool to complete the jetting of the solution to the objective region in a state in which the end face, which includes the outlet for the solution, of the jetting tool is positioned in the solution jetted to the objective region, and the detected distance is in a range of 0.1 mm to 1.0 mm.

2. The solution jetting device according to claim 1, wherein a moving distance of the movable member, which is moved in the second control by the processor, is in a range of 0.1 mm to 3.0 mm.

3. The solution jetting device according to claim 1, wherein the processor performs the third control to control an amount of the solution to be jetted to the objective region to be in a range of 5 ml or less.

4. The solution jetting device according to claim 1, wherein the end face of the jetting tool has a shape of a square of which a length of one side is 0.5 mm or more and less than 2.0 mm or has a shape of a circle of which a diameter is 0.5 mm or more and less than 2.0 mm.

5. A solution jetting device comprising:
a cylindrical member;
a movable member that is movably fitted to a hollow portion of the cylindrical member;
a first drive mechanism that moves the movable member;
a first flow passage that connects a solution container, in which a solution comprising a biological sample or comprising a reagent to be reacted with a biological sample is contained, to the hollow portion;
an openable and closable first on-off valve that is provided on the first flow passage;
a jetting tool that jets the solution to an objective region;
a second flow passage that connects the hollow portion to the jetting tool;
an openable and closable second on-off valve that is provided on the second flow passage;
a second drive mechanism that moves an end face, which includes an outlet for the solution, of the jetting tool in a direction of gravity;
a detector configured to detect a distance between the end face of the jetting tool and a liquid level surface of the jetted solution in the objective region in the direction of gravity; and
a processor configured to control the jetting tool to jet the solution to the objective region by performing first control, second control and third control in this order, wherein the processor performs the first control for sucking a residual of the solution, which remains on the end face of the jetting tool from a previous jetting, toward the hollow portion through the second flow passage by moving the movable member through the first drive mechanism in a state in which the first on-off valve is closed and the second on-off valve is opened, performs the second control for sucking the solution into the hollow portion from the solution container by moving the movable member through the first drive mechanism in a state in which the first on-off valve is opened and the second on-off valve is closed, and performs the third control for discharging the solution, which is present in the hollow portion, to the second flow passage by moving the movable member through the first drive mechanism in a state in which the first on-off valve is closed and the second on-off valve is opened, wherein the processor is configured to control the jetting tool to complete the jetting of the solution to the objective region in a state in which the end face, which includes the outlet for the solution, of the jetting tool is positioned in the solution jetted to the objective region, and the detected distance is in a range of 0.1 mm to 1.0 mm.

6. The solution jetting device according to claim 5, wherein a moving distance of the movable member, which is moved in the first control by the processor, is in a range of 0.1 mm to 3.0 mm.

7. The solution jetting device according to claim 5, wherein the processor performs the third control to control an amount of the solution to be jetted to the objective region to be in a range of 5 ml or less.

8. The solution jetting device according to claim 5, wherein the end face of the jetting tool has a shape of a square of which a length of one side is 0.5 mm or more and less than 2.0 mm or has a shape of a circle of which a diameter is 0.5 mm or more and less than 2.0 mm.

9. A method to control jetting of a solution by a device comprising a cylindrical member, a movable member that is movably fitted to a hollow portion of the cylindrical member, a first drive mechanism that moves the movable member, a first flow passage that connects a solution container, in which a solution comprising a biological sample or comprising a reagent to be reacted with a biological sample is contained, to the hollow portion, an openable and closable first on-off valve that is provided on the first flow passage, a jetting tool that jets the solution to an objective region, a second flow passage that connects the hollow portion to the jetting tool, an openable and closable second on-off valve that is provided on the second flow passage, a second drive mechanism that moves an end face, which includes an outlet for the solution, of the jetting tool in a direction of gravity, and a detector configured to detect a distance between the end face of the jetting tool and a liquid level surface of the jetted solution in the objective region in the direction of gravity, the method comprising:

a first step of sucking the solution into the hollow portion from the solution container by moving the movable member through the first drive mechanism in a state in which the first on-off valve is opened and the second on-off valve is closed;

a second step of discharging a part of the solution, which is present in the hollow portion, to the first flow passage by moving the movable member through the first drive mechanism, after the first step;

a third step of discharging another part of the solution, which is present in the hollow portion, to the second flow passage and jetting the solution to the objective region from the jetting tool by moving the movable member through the first drive mechanism in a state in which the first on-off valve is closed and the second on-off valve is opened, after the second step, and completing the jetting of the solution to the objective region in a state in which the end face, which includes the outlet for the solution, of the jetting tool is positioned in the solution jetted to the objective region and the detected distance is in a range of 0.1 mm to 1.0 mm.

10. The method to control jetting of a solution according to claim 9, wherein a moving distance of the movable member, which is moved in the second step, is in a range of 0.1 mm to 3.0 mm.

11. The method to control jetting of a solution according to claim 9, wherein an amount of the solution to be jetted to the objective region in the third step is 5 ml or less.

12. The method to control jetting of a solution according to claim 9, wherein the objective region is an inside of a reaction container.

13. The method to control jetting of a solution according to claim 9, wherein the end face of the jetting tool has a shape of a square of which a length of one side is 0.5 mm or more and less than 2.0 mm or has a shape of a circle of which a diameter is 0.5 mm or more and less than 2.0 mm.

14. The method to control jetting of a solution according to claim 9, wherein the solution is a colloidal solution comprising an antibody.

15. A method to control jetting of a solution by a device comprising a cylindrical member, a movable member that is movably fitted to a hollow portion of the cylindrical member, a first drive mechanism that moves the movable member, a first flow passage that connects a solution container, in which a solution comprising a biological sample or comprising a reagent to be reacted with a biological sample is contained, to the hollow portion, an openable and closable first on-off valve that is provided on the first flow passage, a jetting tool that jets the solution to an objective region, a second flow passage that connects the hollow portion to the jetting tool, an openable and closable second on-off valve that is provided on the second flow passage, a second drive mechanism that moves an end face, which includes an outlet for the solution, of the jetting tool in a direction of gravity, and a detector configured to detect a distance between the end face of the jetting tool and a liquid level surface of the jetted solution in the objective region in the direction of gravity, the method comprising:

a first step of sucking a residual of the solution, which remains on the end face of the jetting tool from a previous jetting, toward the hollow portion from the second flow passage by moving the movable member through the first drive mechanism in a state in which the first on-off valve is closed and the second on-off valve is opened;

a second step for sucking the solution into the hollow portion from the solution container by moving the movable member through the first drive mechanism in a state in which the first on-off valve is opened and the second on-off valve is closed, after the first step;

a third step of discharging the solution, which is present in the hollow portion, to the second flow passage and jetting the solution to the objective region from the jetting tool by moving the movable member through the first drive mechanism in a state in which the first on-off valve is closed and the second on-off valve is opened, after the second step, and completing the jetting of the solution to the objective region in a state in which the end face, which includes the outlet for the solution, of the jetting tool is positioned in the solution jetted to the objective region and the detected distance is in a range of 0.1 mm to 1.0 mm.

16. The method to control jetting of a solution according to claim 15, wherein a moving distance of the movable member, which is moved in the first step, is in a range of 0.1 mm to 3.0 mm.

17. The method to control jetting of a solution according to claim 15, wherein an amount of the solution to be jetted to the objective region in the third step is 5 ml or less.

18. The method to control jetting of a solution according to claim 9, wherein the objective region is an inside of a reaction container.

19. The method to control jetting of a solution according to claim 15,
wherein the end face of the jetting tool has a shape of a square of which a length of one side is 0.5 mm or more and less than 2.0 mm or has a shape of a circle of which a diameter is 0.5 mm or more and less than 2.0 mm.

20. The method to control jetting of a solution according to claim 15,
wherein the solution is a colloidal solution comprising an antibody.

* * * * *